(12) United States Patent
Geltinger

(10) Patent No.: US 10,647,047 B2
(45) Date of Patent: May 12, 2020

(54) BLOW MOLDING MACHINE WITH AUTOMATICALLY ACTUATED BASE COUPLING

(71) Applicant: KRONES AG, Neutraubling (DE)

(72) Inventor: Florian Geltinger, Donaustauf (DE)

(73) Assignee: KRONES AG (DE)

( * ) Notice: Subject to any disclaimer, the term of this patent is extended or adjusted under 35 U.S.C. 154(b) by 312 days.

(21) Appl. No.: 15/511,260

(22) PCT Filed: Oct. 9, 2015

(86) PCT No.: PCT/EP2015/073492
§ 371 (c)(1),
(2) Date: Mar. 15, 2017

(87) PCT Pub. No.: WO2017/059930
PCT Pub. Date: Apr. 13, 2017

(65) Prior Publication Data
US 2017/0291347 A1    Oct. 12, 2017

(51) Int. Cl.
*B29C 49/48* (2006.01)
*B29C 33/26* (2006.01)
(Continued)

(52) U.S. Cl.
CPC ............. *B29C 49/48* (2013.01); *B29C 33/26* (2013.01); *B29C 33/28* (2013.01); *B29C 33/305* (2013.01);
(Continued)

(58) Field of Classification Search
CPC .... B29C 2049/4856; B29C 2049/4858; B29C 2049/4864; B29C 2049/4892
See application file for complete search history.

(56) References Cited

U.S. PATENT DOCUMENTS 2,269,553 A *   1/1942   Roessler ................... C03B 7/10
                                                    65/75
8,714,957 B2 *  5/2014   Blochmann ............. B29C 49/56
                                                    425/182
(Continued)

FOREIGN PATENT DOCUMENTS

DE     102009050637 A1    11/2010
DE     102009054385 A1 *   7/2011    ............. B29C 33/04
(Continued)

OTHER PUBLICATIONS

Partial machine translation of DE 102009054385 A1 dated Jul. 2011. (Year: 2011).*

(Continued)

*Primary Examiner* — Robert B Davis
(74) *Attorney, Agent, or Firm* — Schmeiser, Olsen & Watts, LLP

(57) ABSTRACT

A system is provided for transforming plastic parisons into plastic containers with at least one transforming station which has a blow mold within which the plastic parisons can be expanded by application of a gaseous medium, wherein the blow mold has a base part which is disposed releasably on a support, and with a first fastening mechanism in order to fasten the base part to the support, and wherein the blow mold has at least one side part which is disposed releasably on a support and a second fastening mechanism in order to fasten the side part to the support.

22 Claims, 8 Drawing Sheets

(51) Int. Cl.
  *B29C 33/30* (2006.01)
  *B29C 49/36* (2006.01)
  *B29C 49/06* (2006.01)
  *B29C 33/28* (2006.01)
  *B29K 105/00* (2006.01)
  *B29L 31/00* (2006.01)

(52) U.S. Cl.
  CPC .............. *B29C 49/06* (2013.01); *B29C 49/36* (2013.01); *B29C 2049/4856* (2013.01); *B29C 2049/4858* (2013.01); *B29C 2049/4864* (2013.01); *B29C 2049/4892* (2013.01); *B29K 2105/253* (2013.01); *B29L 2031/712* (2013.01)

(56) References Cited

U.S. PATENT DOCUMENTS

2009/0178264 A1* 7/2009 Stoiber ................ B29C 33/306
                                                                29/401.1
2011/0049742 A1* 3/2011 Senn ........................ B29C 49/48
                                                                264/40.1
2013/0207319 A1 8/2013 Haesendonckx et al.

FOREIGN PATENT DOCUMENTS

| DE | 102010048720 A1 | 4/2012 |
| DE | 102011050724 A1 | 12/2012 |
| EP | 12993223 A1 | 4/2003 |
| EP | 2444233 A2 | 4/2012 |

OTHER PUBLICATIONS

Chinese Office Action dated Sep. 17, 2018 for Application No. 2015800541433.
Non-English partial European Search Report for Application No. 18215190.2.

* cited by examiner

Fig. 10
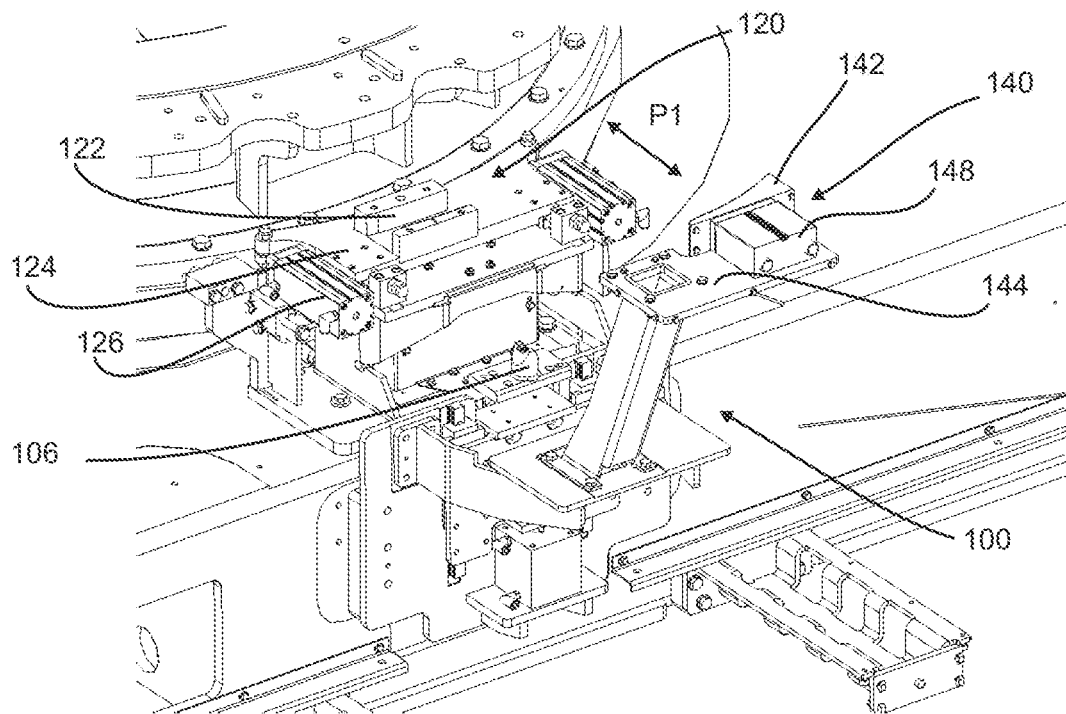
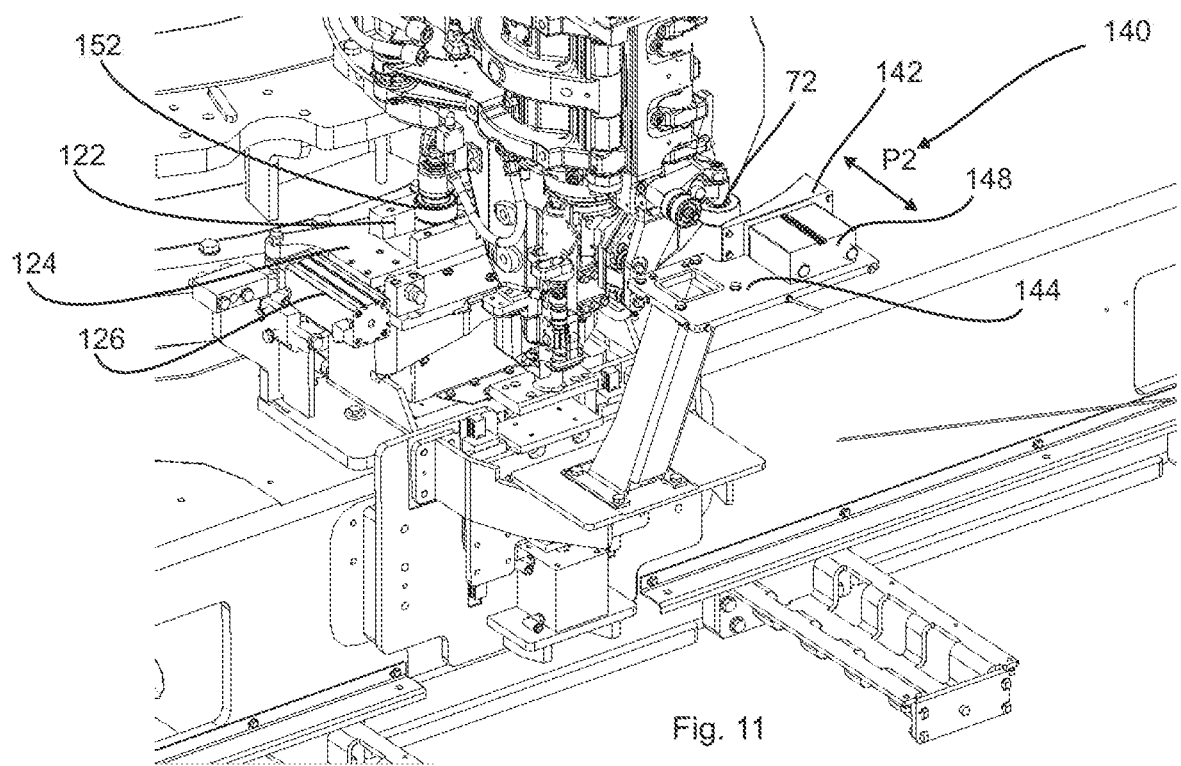
Fig. 11

BLOW MOLDING MACHINE WITH AUTOMATICALLY ACTUATED BASE COUPLING

CROSS-REFERENCE TO RELATED APPLICATIONS

This application claims priority to PCT Application No. PCT/EP2015/073492, having a filing date of Oct. 9, 2015, the entire contents of which are hereby incorporated by reference.

FIELD OF TECHNOLOGY

The following relates to a system and a method for transforming plastic parisons into plastic containers. Such systems and methods have been known.

BACKGROUND

In this case plastic parisons which have been heated in the usual way are delivered to a blow molding device, such as in particular a stretch blow molding machine, and can be expanded thereby to form plastic containers.

These blow molding machines usually have a plurality of blow stations which in turn are equipped with blow mold, in the interior of which the plastic parisons are transformed by the application of compressed air to form the plastic containers and in particular plastic bottles. However, when such devices are in operation it is often necessary to replace the blow molding devices. This may be necessary for example if it is intended to change over from a specific container type to another container type or container shape.

In this case in the known art this changeover is a relatively complex process, since the blow mold must be replaced at each of the individual transforming stations. In the known art this takes place in the usual way using tools, such as for example screwdrivers and the like.

DE 10 2010 048 720 A1 describes a base mold which can be quickly assembled with the additional assistance of a holding force. In this case release of the base part of the blow mold from a support can be achieved here by a rotary movement of a locking element.

EP 1 299 223 B1 describes a system for blow molding containers. In this system a manual lever is used to release the base part. However, automated release of the base part is hindered by this manual lever.

In some blow molding devices it is necessary or advantageous within the context of the production process for the walls thereof to be temperature-controlled, for example cooled. For this purpose the corresponding blow molding devices or the side parts thereof or the base parts thereof have temperature control channels within which a temperature control medium can flow. These temperature control channels are connected to a coolant supply, for example to a water supply, and thus in working operation the temperature control can be achieved or maintained.

SUMMARY

An aspect relates to a system and a method which should enable a comparatively quick changing operation of the blow molding device and preferably also at least partially automatic changing of blow mold parts.

A system according to embodiments of the invention for transforming plastic parisons into plastic containers has at least one transforming station which in turn has a blow mold within which the plastic parisons can be expanded by application of a gaseous medium. In this case the blow mold has a base part which is disposed releasably (and at least indirectly) on a support. Furthermore the system has a fastening mechanism in order to fasten the blow mold and in particular the base part to this support. Furthermore, the blow mold has at least one side part which is disposed releasably on a support, and a second fastening mechanism in order to fasten the side part to the support.

According to embodiments of the invention the first fastening mechanism can be actuated by a free-flowing medium in order to unlatch the base part from the support (or in order to release it from the support or to make it releasable therefrom) and the second fastening mechanism can be actuated by a free-flowing medium in order to unlatch the side part from the support (or in order to release it from the support or to make it releasable therefrom), wherein, furthermore, a—preferably central—media connection device is provided in order to deliver the free-flowing medium to the fastening mechanisms and in particular simultaneously to a plurality of fastening mechanisms. As is explained in greater detail below, a plurality of transforming stations are preferably disposed on a common support and these transforming stations in each case have a media connection device.

In particular, the media connection device is a common, in particular central media connection device, by which the free-flowing medium can be delivered to both fastening mechanisms. The free-flowing medium is preferably a gaseous medium and in particular compressed air. The system preferably also has a second side part, which is likewise disposed in a corresponding manner on a support.

Furthermore, embodiments of the present invention is directed to a system for transforming plastic parisons into plastic containers which has at least one transforming station which in turn has a blow mold within which the plastic parisons can be expanded by application of a gaseous medium. In this case the blow mold has a base part which is disposed releasably on a support and has a first fastening mechanism in order to fasten the base part to the support. Additionally or alternatively, the blow mold has at least one side part which is disposed releasably on a support, as well as a second fastening mechanism in order to fasten the side part to the support. The system preferably also has a second side part, which is likewise disposed in a corresponding manner on a support.

According to embodiments of the invention the system has an actuating device for actuating at least one of the fastening mechanisms in order to actuate thus mechanism. Furthermore, the transforming station is movable in at least the direction of movement of the support relative to this actuating device. In this embodiment it is therefore proposed that an actuating device which is in particular stationary, at least stationary with respect to the rotary movement of the carrier (which is designed as an actuator or has an actuator), is provided which, if required, in particular for disassembly purposes, can be approached by the transforming station.

A plurality of transforming stations is advantageously disposed on the support, so that for disassembly purposes (for example changing of the blow mold) each individual one of these transforming stations can be delivered to the actuating device, so that the fastening mechanisms of all the transforming stations can be controlled by this actuating device. In this way the automation of the blow mold changing operation can be made considerably easier. In this case it is possible that for insertion of a blow mold into the mold support or the base mold an exact positioning of the support (also designated below as a blow molding wheel) or the transforming station relative to the mold change system fixed locally here, i.e. the actuating device and/or a further robot, which serves for removal of the blow molds, is performed.

An actuating device is understood to be a device which is suitable and intended in particular for actuation of the fastening mechanism and which in particular is suitable and intended for changing of the fastening mechanism at least from a first state, in which the side parts or the base part are retained on their supports, into a release state, in which the side parts or the base part can be released from the respective supports. In this case this actuating device can for example provide compressed air, which in turn serves for actuation of the fastening mechanisms.

In a further advantageous embodiment at least one fastening mechanism can be switched between at least two states, in particular a state in which the base part or the side part is latched with the support respectively associated with it and/or is retained on this support, and a second state, in which the base part or the side part is unlatched from the support respectively associated with it and/or can be removed therefrom.

The above-mentioned blow mold is preferably made up of two side parts, preferably a left mold shell and a right mold shell as well as a base mold. These elements surround a hollow space inside which, in operation, the plastic parisons are transformed into the plastic containers. A common media connection, by which the free-flowing medium can be delivered to the three fastening mechanisms, is preferably provided for each transforming station.

Preferably at least one fastening mechanism is configured in such a way that it is in a latched state in a pressureless state with respect to the free-flowing medium. Preferably a plurality and, particularly preferably, all of the above-mentioned fastening mechanisms are configured in such a way that they are in a latched state when in a pressureless state with respect to the free-flowing medium. In this way at least parts of the blow mold and preferably the entire blow mold can be fixed to the support in a pressureless state. In this way, even in the event of a failure of the pressure supply, the blow mold parts can be retained on their respective supports.

In a further advantageous embodiment, at least one fastening mechanism can be brought from a latched state into an unlatched state by the application of a predetermined (over)pressure of the free-flowing medium (which is in particular compressed air), wherein this predetermined pressure is preferably greater than 2 bars. Thus at least a part of the blow mold and preferably the entire blow mold should preferably be unlatched by the delivery of compressed air. This pressure is preferably greater than 3 bars, preferably greater than 4 bars, preferably greater than 5 bars, preferably greater than 6 bars, preferably greater than 7 bars and preferably greater than 8 bars.

The said pressure, which serves for unlatching the blow mold or the parts thereof, is advantageously less than 20 bars, preferably less than 18 bars, preferably less than 15 bars, preferably less than 12 bars and particularly preferably less than 11 bars. Instead of compressed air, another gas or also a liquid medium, in particular a hydraulic medium, could also be used.

A pressure in a range from 9 to 10 bars, or a relatively high pressure, is preferably used in order thus to achieve a high force density and in order advantageously to produce a smaller installation space. However, it would be also be possible to apply a negative pressure for unlatching the blow molds.

In a further advantageous embodiment, the media connection device is in flow connection with at least one fastening mechanism by at least one supply line, preferably an (at least partially) flexible supply line. Flexible hoses are advantageously provided which lead from the central media connection to the respective receiving means or fastening mechanisms of the blow mold.

Advantageously a plurality of supply lines are provided, which connect the central media connection to the individual fastening mechanisms (in order thus to produce a fluid connection between the media connection device and the fastening mechanisms). In a further advantageous embodiment the media connection is disposed stationary or immovably with respect to the transforming device (in particular with respect to a support of the transforming device). More precisely, in operation this media connection preferably rotates together with the individual transforming stations of the transforming device.

Particularly preferably, a plurality of such transforming stations can for example be provided and each individual one of these transforming stations can have the said central media connection. Thus for example a plurality of such transforming devices can be disposed on a rotatable support. In each case a removal of the individual blow molds from each transforming station is possible due to the respective individual connections. A simultaneous unlatching of all blow mold parts (base mold and side parts) is possible due to the central media connection for each transforming station.

In a further advantageous embodiment the delivery of the free-flowing medium, in particular the compressed air, to the media connection device can optionally take place manually, for example by a compressed air spiral hose to be connected by the operator, or automatically, by an actuator supported by a machine control system, for instance the aforementioned actuating device.

In a further advantageous embodiment the blow mold has at least one further or second side part which is disposed releasably on a support, as well as a further fastening mechanism in order to fasten the side part or side parts to the support or supports. In this way—as mentioned above—the blow mold preferably has two side parts and one base part. The side parts as well as the base mold preferably have the same fastening mechanisms.

In a further advantageous embodiment the system has a latching mechanism which, in a working operation, and in particular simultaneously, latches the two side parts or the supports thereof to one another. Furthermore, the system preferably has a drive in order to pivot or to open the two side parts, i.e. more precisely to pivot them apart. In this case it is possible for a machine control to be provided which, during or after the automatic delivery of the free-flowing medium, also controls opening and unlatching of the mold support (so that the blow molds can be removed). The mold supports are advantageously opened by a movable cam segment. The cam piece is controlled by a pneumatic cylinder. The release of the latching takes place likewise by a cam.

As is explained in greater detail below, a first operating member and in particular a guide cam for opening the blow mold, and/or a second operating member and in particular a second guide cam for unlatching the side parts of the blow mold or the blow mold support, can be provided on the above-mentioned actuating device.

In a further preferred embodiment the fastening mechanism has a pretensioning device by which at least one blow mold part is fixed by non-positive and/or positive engagement on the support associated with this blow mold part. Thus in particular one tensioning element which fixes the blow mold parts by non-positive and positive engagement can be provided for each blow mold part. This tensioning element ensures that locking takes place in a pressureless state. This tensioning force of the tensioning element can be overcome by the delivery of compressed air. Therefore this pretensioning device can be acted upon by the free-flowing medium. In particular, the pretensioning device can be acted upon by the free-flowing medium in order to change a position of the pretensioning device or of a release element actuated by the pretensioning device. The free-flowing medium can advantageously be supplied by the above-mentioned flexible hoses.

The pretensioning device is preferably an elastic element and particularly preferably a spring element.

In a further advantageous embodiment the (pre)tensioning elements are not placed in parts of the blow mold, but in parts of the supports, for example in the left mold support shell, the right mold support shell and the base support. In this way these elements always remain at the transforming station when the blow molds are changed.

In a further advantageous embodiment the fastening mechanism has a movable piston which is displaceable by the free-flowing medium into a first position and/or is displaceable by the pretensioning devices into a second position. Advantageously, the first position is an unlatched state in which the blow mold can be removed from the support.

In a further advantageous embodiment the fastening mechanism is configured in such a way that, in the event of incorrect insertion of the blow mold parts, the mold supports and the base mold can no longer be closed and latched. Thus, for example, the tensioning element can be designed with a corresponding counterpart in such a way that the mold supports can only be closed when the blow mold parts are correctly inserted. In this way the error protection can be increased.

Furthermore, it is pointed out that the features described above can also be combined with a fully automatic change of blow molds, i.e. a change in which the blow mold parts can be replaced for example by a robot device.

In a further advantageous embodiment at least one element of the actuating device is suitable and intended for producing a connection by positive and/or non-positive engagement to at least one element of the transforming station. The element of the transforming station may preferably be the aforesaid central media connection, wherein by this positive and/or non-positive connection the delivery of a free-flowing medium, for example compressed air, to the respective fastening mechanisms is possible. More precisely, a positive and/or non-positive connection between a locally fixed platform, for example a main support of the system and the rotatably mounted blow molding wheel, can be produced.

In a further advantageous embodiment the system has a positioning device in order to position the transforming station relative to the actuating device. In this case for example a groove or the like, into which a counterpart of the actuating device can move, is provided on the transforming station in order to achieve a positive connection and thus a precise positioning. Conversely, however, a groove which co-operates with a corresponding counterpart on the transforming device can also be provided on the actuating device.

In a further advantageous embodiment the above-mentioned positive and/or non-positive connection is produced by an actuator mounted on the platform. In this case, for example, this actuator can be raised in a vertical direction and advanced towards a region of the transforming station.

By this procedure an exact positioning of the transforming station, or of the carrier with the transforming stations, can be achieved for the changing operation. Alternatively or instead of a positive and/or precise positioning of the blow molding wheel or the transforming stations it would also be conceivable to provide a camera system for the mold change operation. This camera system could, for example, be integrated into a robot head, in order to recognise the precise position of the mold and the blow molding stations.

In a further advantageous embodiment the actuating device produces a fluid connection, so that at least one fastening mechanism can be acted upon by a free-flowing medium in order to switch this fastening mechanism between at least two positions. In this way—as mentioned above—the fastening mechanism can be changed from a locked state (pressureless) into a released state (pressurised), which then enables removal of the blow molding stations.

In a further advantageous embodiment the actuating device has an actuator element, wherein this actuator element preferably has a first positively engaging element, which is suitable and intended for co-operation with a second positively engaging element which is disposed on the transforming station and/or the blow molding wheel, in order thus to produce positively engaged connection. Therefore a positively engaging element, which can engage in a corresponding counterpart element on the transforming station, is preferably provided on the actuator. Conversely, however, the counterpart element on the transforming station can engage positively in the actuator element.

All the transforming stations advantageously have the above-mentioned counterpart elements, so that each individual transforming station can move to a precise position with respect to the actuating device. In this case it would be possible for these inter-engaging elements to be arranged on each transforming station and also on the actuator element. On the transforming stations the elements are preferably mounted on a mold support or directly on the blow molding wheel.

In this way an automatic delivery of a compressed air connection for supplying the stations or the fastening mechanisms is preferably achieved. More precisely, for each transforming station the above-mentioned tensioning elements in turn can be supplied centrally by a common media connection for unlatching or latching.

In a further advantageous embodiment the actuating device has at least one operating member in order to open and/or close the mold supports and/or the blow mold and/or an operating member for latching and/or unlatching of the mold support. The actuating device preferably has at two such operating members in order to effect opening and/or closing of the mold supports and/or the blow mold and also an operating member for latching and/or unlatching of the mold support.

These operating members can preferably effect an opening and/or closing of the blow mold and/or an unlatching and/or latching during a shutdown of the transforming station or during a shutdown of the support on which the transforming stations are disposed. In a normal working operation opening and closing of the blow mold and/or latching or unlatching preferably take place during a movement of the transforming stations and in particular also right through this movement.

In a further advantageous embodiment at least one of these operating members and preferably both operating members are guide cams or these operating members have a guide cam. This operating member and in particular this guide cam are preferably movable. A driving device is preferably also provided in order to move at least one of these operating members. A driving device is preferably provided for each drive in order to move these operating members. Preferably at least one of these driving devices is a driving device which is selected from a group of driving devices which includes electrical driving devices, pneumatic driving devices, hydraulic driving devices, magnetic driving devices and the like.

A mold support control roller (for opening/closing) preferably moves into the operating member, in particular the cam segment, due to the rotation of the blow molding wheel. After the blow molding wheel is stationary (and preferably has also been centred and the compressed air connection has preferably been produced between the actuator and the blow molding station), the operating member or cam segment is operated and the opening movement is initiated, whilst a second cam segment is preferably operated in order to release the latching. The operation of the segments preferably functions by pneumatic cylinders.

In a further preferred embodiment the first fastening mechanism can be actuated by a free-flowing medium in order to unlatch the base part from the support and the second fastening mechanism can likewise be actuated by a free-flowing medium in order to unlatch the side part or the side parts from the support or supports, wherein, furthermore, a media connection device is provided in order to deliver the free-flowing medium to the fastening mechanisms.

In a further advantageous embodiment the system has a gripping device in order to remove a blow mold or parts of the blow mold from the transforming station. Thus in a largely automated embodiment a robot device can be provided, which removes the blow mold from the transforming stations after unlatching. Due to the precise positioning of the blow molding wheel it is possible that this robot device can be controlled very accurately and precisely for the removal.

In a further advantageous embodiment the system has a coupling element in order to produce a flow connection for the free-flowing medium. In this case a corresponding coupling piece which co-operates with a further coupling piece on the transforming station can be provided in the above-mentioned actuating device.

In this case this coupling element for linking of the compressed air connection is preferably integrated into the positively engaging element of the actuator. This means that when the actuator moves into the counterpart element the pressure connection is also produced. Thus it is possible for coupling of this compressed air connection to take place by an outward movement of the actuator element.

The system, in particular the transforming station, preferably has at least one first connector in order to deliver a free-flowing temperature control medium to the system, in particular to the transforming station and in particular also to the base part and/or the side parts, wherein particularly preferably this delivery of the temperature control medium via a connector (in particular by a flow passing through the connector) can be separated or interrupted by removal or a removal movement of the base part from the support.

This first fastening mechanism preferably has a release element which is movable in a predetermined straight direction, wherein by a displacement of this release element into a first predetermined position the fastening of the base part on the support is releasable and by a displacement of this release element into a second predetermined position the base part can be fastened on the support.

It is therefore proposed that the fastening of the base part or release of this fastening is preferably achieved by a movement of this said release element in a straight line. This said movement in a straight line can be achieved in a relatively simple manner for instance by pneumatic means. In this way automatic removal of the base part from the blow mold can be achieved. Advantageously the release element is an actuating element which at least indirectly effects locking of the fastening or release of this locking. In this case it is possible for this release element or actuating element in turn to actuate or move a further element and by this actuation to achieve the locking or release of the locking. Therefore the actuating element can preferably be moved in a first direction for locking and in a second direction which is opposed to the first direction for release of the locking.

As mentioned above, in the manufacture of the containers it is sometimes necessary for the respective blow molds or also the base parts to be temperature-controlled and in particular cooled. This purpose is served by the connector described here, by which ultimately the base part can be connected to a supply of temperature control medium and in particular to a water supply. Thus by removal of the base part from the support the supply of temperature control medium can also be interrupted (in particular substantially simultaneously).

Advantageously the second fastening mechanism has a release element which is movable in a predetermined straight direction, and by a displacement of this release element into a first predetermined position the fastening of the side part on the support is releasable and by a displacement of this release element into a second predetermined position the side part can be fastened on the support.

Thus within the scope of an advantageous embodiment of the invention the same mechanism is proposed for the fastening of the side part or the side parts as for the base part. The fastening mechanism of the base part is described in the context of the following description of the drawings set out below. A corresponding fastening mechanism is also used for fastening the side parts. However, in the installed state this fastening mechanism is rotated substantially by 90° relative to the fastening mechanism of the base part. Two such fastening mechanisms are preferably provided for holding the side parts (one fastening mechanism per side part).

The fastening mechanism described here offers the advantage that it enables automatic release and/or fastening of the side part or base part from or on the support. The support of the side part is preferably a so-called blow mold support shell. When the side part is replaced this blow mold support shell can remain fastened on a blow mold support and the side part is released from the blow mold support shell. Thus this fastening mechanism is preferably constructed between the blow mold support shell and the side part.

However, it would also be conceivable for this fastening mechanism to be constructed between the blow mold support and the blow mold support shell or between the blow mold support and the side part. The side part is preferably disposed directly on the blow mold support shell.

Furthermore in this case the transforming station has at least one first connector in order to deliver a free-flowing temperature control medium to the transforming station and in particular to the side part, and this delivery of the temperature control medium can be separated from the carrier by the connector by removal of the side part. It is therefore also proposed that the side part has temperature control channels through which a temperature control medium can flow in order thus to control the temperature of this side part, for instance to cool it.

The design of this temperature control and also of the fastening mechanism is described below predominantly with reference to the base part. However, it is pointed out that these designs are correspondingly also applicable to the fastening of the side part.

In an advantageous embodiment the base part is disposed by at least one intermediate support on the said support. In this case it is possible that the intermediate support is disposed on the base part and this intermediate support also functions for example as a spacer. A fastening part can also preferably be disposed on this intermediate support, but optionally also on the base part itself, and in turn a part of the fastening mechanism can be disposed on this fastening part.

In a further advantageous embodiment, as set out above, the system or the transforming station also has two side parts which, preferably together with the base part, delimit the hollow space within which the plastic parisons are transformed into the plastic containers.

Advantageously the above-mentioned side parts of the blow molding device are also in each case disposed on a blow mold support. In this case the side parts are preferably disposed on blow mold support shells and these blow mold support shells are in turn disposed on blow mold supports. Advantageously the blow mold supports on which the side parts are disposed can swivel about a swivel axis, in particular a common swivel axis in order in this way to open and close the blow molding device. In this case this swivel axis advantageously extends parallel to the longitudinal direction of a plastic parison or also of a plastic container to be produced therefrom.

Furthermore the system advantageously has an application device in order to apply a free-flowing and in particular a gaseous medium (in particular with compressed air) to the plastic parisons. This application device is advantageously a blow molding die which can be applied to the plastic parison in order to expand it. Advantageously in this case the application device can be delivered to the plastic parison by a driving device. In a further advantageous embodiment the system also has a rod-like element which can be introduced into the interior of the plastic parisons in order to expand these containers in their longitudinal direction. Thus the system preferably has a so-called stretching rod, and the system is advantageously a stretch blow molding machine.

In a further advantageous embodiment the side parts can also engage in regions of the base part in order to close the blow mold. In a further advantageous embodiment the system has a plurality of transforming stations which particularly preferably are disposed on a common support. This support is in particular a rotatable support, such as a so-called blow wheel.

Advantageously at least one space to which a gaseous medium can be applied is constructed between the blow mold support parts and the blow mold parts or side parts. In this way in particular a pressure pad can be constructed by which a blow mold part can be delivered to the other blow mold part during the expansion process. Thus advantageously at least one blow mold part has, relative to the blow mold part on which it is disposed, a certain mechanical play in a direction perpendicular to a plane which in a closed state of the blow mold is defined between the two blow mold parts.

In a further advantageous embodiment the above-mentioned release element can be actuated or moved automatically. Advantageously this release element can be actuated by a flow medium, that is to say it can be actuated in particular hydraulically or pneumatically. However, it would also be conceivable for the release element to be actuated by a magnetic force. Thus it would be conceivable to provide a robot device which automatically carries out such a change of the base part and/or the side part. For this purpose first of all the fastening mechanism could be released and then the relevant side part could be removed. Advantageously the release element is not accessible for a user or operator without the fastening mechanism being released and the blow mold part being removed for this purpose, for example in that it is disposed inside the aforementioned support.

The system according to embodiments of the invention preferably has the described fastening mechanisms both for the side part or the side parts of the blow molding device and also for the base part. Thus it would be possible for the fastenings of the side parts and also of the base part to be released or produced automatically. Furthermore it would be conceivable that, in particular after release of the respective fastening mechanisms, the blow molding device in its entirety is removed from the transforming station. In this case it would in particular be conceivable that further locking mechanisms are provided which fasten the side parts and the base part of the blow mold to one another, in particular for an installation operation and a removal operation, so that the blow molding device can be installed or removed in an assembled state.

Furthermore for example the support can have a contact surface which in an installed state rests on a fastening element fastened at least indirectly on the base part (or the side part) (or a corresponding contact surface of this fastening element) and a first component of the fastening device can be disposed within this contact surface. In a locked state of the base part or of the side part on the support, the fastening device is preferably completely surrounded in the peripheral direction by regions or material of the support. The release element advantageously has a circular cross-section.

In a further advantageous embodiment the system has a guiding device which guides the release element. In this case for example a sleeve body can be provided, within which the release element is movably mounted. Conversely, however, the guide element can also (preferably) be constructed as a rod-like body which in turn engages in the release element and thus effects guiding of the release element.

The release element (which serves for fastening of the base part) can advantageously be actuated in the longitudinal direction of the plastic parisons to be expanded. Advantageously this relates to the same direction in which the above-mentioned stretching rod is also introduced into the interior of the plastic parisons. The release element (which serves for fastening of the side part) can advantageously be actuated perpendicular to the longitudinal direction of the plastic parisons to be expanded. In the case of fastening of the side parts the release element is preferably disposed displaceably on the blow mold support shell.

Advantageously, by removal of the base part or of the side part from the respective support (in particular from the blow mold support shell in the case of the side part) this connection for the temperature control medium or the cooling agent can also be broken. Preferably, in the same working step, although not necessarily simultaneously, not only can the base part or the side part be released from the support but also the supply of the temperature control medium can be interrupted. Thus it is preferably possible that for example the base part—optionally together with an intermediate support disposed on the base part and/or a fastening element—is lifted off from the support and thus disconnected and by the same operation the connection(s) for the temperature control medium is/are interrupted. The connections for the temperature control medium can preferably be produced by a feeding movement of the base part towards the support.

In a further advantageous embodiment the base part or the side part can be removed after release of the fastening mechanism by a movement in a straight direction. Advantageously in the case of the base part or the side part this is the same direction in which the release element is also movable. In the case of the base part this may be a direction which is parallel to the longitudinal direction of the plastic parisons, namely in the case of the side part a direction which is substantially perpendicular to the longitudinal direction of the plastic parisons. Movable elements of the respective fastening mechanisms such as in particular the release element and/or the locking element are preferably disposed on the respective supports. This has the advantage that these elements remain on the machine when the blow molding devices are replaced.

In a further advantageous embodiment the first connector has a first connecting element as well as a second connecting element, which can be coupled to one another by a relative movement of one connecting element relative to the other connecting element in a straight direction, in order to deliver the free-flowing temperature control medium to the transforming station and in particular the base part or the side part of the blow molding device. Therefore due to this coupling and/or uncoupling facility of the connectors it is possible that by the same movement, namely a removal movement of the blow mold from the support, the connections are also broken and conversely in the event of delivery of the blow mold part to the support the connectors or the connecting elements thereof are connected to one another.

Advantageously at least one connecting element, and in particular a connecting element which is disposed at least indirectly on the blow mold part, has a valve device which closes when the connecting elements are separated, so that after the separation operation no temperature control medium can flow out of the base part.

In other words, by a relative movement of the connecting elements with respect to one another a fluid communication between a supply of temperature control medium and the base part or the side parts can be produced or also interrupted.

In a further advantageous embodiment the mentioned straight direction also corresponds to the direction of removal of the base part or of the side part and/or the direction of movement of the release element.

In a further advantageous embodiment the release element has a rod-shaped body and/or a body which extends in the above-mentioned direction of movement of the release element.

Advantageously at least one connecting element also extends and particularly preferably both connecting elements extend in the above-mentioned direction in which the release element can also be moved. Thus if, as is frequently the case in the known art, plastic parisons are introduced in an upright state into the blow mold, the mouth of each parison being oriented upwards, advantageously the connecting elements can also extend (in the case of the base part) in the longitudinal direction of the plastic parisons and (in the case of the side part or the side parts) substantially perpendicular to this longitudinal direction. The connecting elements are preferably designed as plug and coupling.

In this way changing of the base part and/or of the side part can be carried out automatically. Thus for example by a changing robot the base part can be gripped and, after release of the fastening mechanism, can be removed from the support. In the same working operation the temperature control medium connection can also be released. An automatic actuation of the release element, in particular in the context of a blow mold changing process, is made possible by the procedure described above. In this case, as mentioned above, the release element can be moved automatically.

In a further advantageous embodiment the system has a second connector in order to draw off the temperature control medium from the base part. In this way the base part can be incorporated into a temperature control circuit. Advantageously this delivery can be disconnected by removal of the base part. In this case it is also preferable here for the second connector to have two connecting elements which can be connected to or disconnected from one another by a relative movement and in particular a relative movement in the direction described above. In this way it is also possible to incorporate the base part automatically into a temperature control circuit.

In a further advantageous embodiment the connectors and/or connecting element are disposed offset with respect to one another in the above-mentioned direction, i.e. the direction in which the base part is removed from the support. In this way it is possible that when the base part is installed on the support first of all one connector and then the other is actuated or connected. In this way a chronologically staggered connection of the two connectors or of the respective connecting elements to a temperature control circuit is possible.

By a spring-loaded arrangement of one connecting element it can be provided that when the base part is delivered to the support first of all the respective connecting element is moved before it co-operates with the other connecting element or is connected thereto. Also by this spring-loaded arrangement of the connecting element this connecting element can be automatically restored to a predetermined starting position.

In a further advantageous embodiment the fastening mechanism has a locking element which is movable by a movement of the release element in the direction between at least two positions, wherein in one of these positions locking is produced between the support and the base part or the side part and in the other position locking is released between the support and the base part or the support and the side part.

Thus it would be possible for example that the release element is moved in the longitudinal direction of the plastic parisons and in this way a transverse movement of the locking element is initiated. Preferably the release element has a widened portion, for example a conically extended portion or an inclined surface which is preferably in contact with the locking element. In this way by a movement of the release element in the direction described above a movement of the locking element in particular in a direction which is perpendicular hereto or oblique can be achieved.

By this movement of the locking element it is possible that as a consequence of a movement of the release element the locking element engages in a further element of the fastening device. Advantageously the locking element and particularly preferably the release element is also disposed on the support. A corresponding undercut or an engaging recess, in which the locking element can engage, is particularly preferably disposed at least indirectly on the base part, for example on the intermediate support or a fastening body firmly disposed on the intermediate support.

In a further advantageous embodiment the locking element is movable by the movement of the release element in a direction different from the direction of movement of the release element.

As mentioned, an inclined surface, i.e. an inclined surface with respect to the longitudinal direction, which forms a contact surface with the locking element, is preferably disposed on the release element.

In a further preferred embodiment it is also possible for a plurality of the described locking elements to be provided. In this case it is possible that by a movement of the release element a plurality of locking elements are simultaneously moved and for example introduced into corresponding recesses in a retaining element. Also the locking element could be an annular element which surrounds the release element and in particular the inclined surface of this release element in the peripheral direction thereof. The locking element is preferably movable in a radially extending direction with respect to the longitudinal direction of the release element. The locking element can preferably engage behind a portion of a further fastening element and in particular a fastening element disposed indirectly on the base part.

In a further advantageous embodiment the said fastening device is disposed at least in part between the connectors. Thus for example it is possible that, relative to a longitudinal direction of the plastic parisons, the fastening device is disposed for example in a radially inner region of the support and a fastening element. In this way the fastening device is preferably always disposed inside the support and in particular is not accessible from the exterior.

In a further advantageous embodiment the fastening device has a receiving chamber which is suitable to receive a gaseous medium. A pneumatic medium, for example compressed air, can be applied to this receiving chamber in order thus to move the release element. Thus a piston disposed inside the said receiving chamber is disposed for example on the release element. Compressed air can be applied to this piston in order thus to move the release element. Furthermore it is possible to provide sealing elements in order to seal the piston relative to the receiving chamber.

In a further advantageous embodiment the fastening mechanism has a pretensioning device which pushes the release element in a predetermined direction. This is advantageously a direction which determines a locking position. This is advantageously a position in which the locking element is delivered in the direction of a recess in order thus to produce locking. In a further preferred embodiment, in a locked state of the base part this pretensioning device can also hold this base part on the support.

In a further advantageous embodiment the system has a base part intermediate support on which is disposed a recess in which in turn at least parts of the fastening device are disposed.

In a further advantageous embodiment the fastening device has a receiving chamber to receive a pneumatic medium. If a pneumatic medium, in particular compressed air, is applied to this receiving chamber the release element can be moved in this way. However, it would also be conceivable for the release element to be moved using magnetic forces.

In a further advantageous embodiment at least the base part and/or at least one side part (and preferably both side parts) can be removed automatically by the respective support on which this base part or this side part is disposed.

In terms of the method, the release of the base part or side part from the support and/or the fastening of the base part or side part on the support is preferably carried out automatically. For this purpose a robot device can for example grip the blow molding device, the fastening mechanisms can be released and the blow molding device can be removed from the transforming station. In this case the blow molding device can preferably be removed in its entirety from the transforming station.

In a further preferred embodiment the actuation of the fastening mechanism for the base is coupled to the actuation of the fastening mechanism for at least one side part. In this case such a coupling can take place pneumatically, but it would also be conceivable for this coupling to take place hydraulically or by an (electronic) control. In this way it is possible in particular for all the fastening mechanisms to be automatically released substantially but not necessarily simultaneously, but in one working step (in order then to be able to remove the blow mold), or to be latched (in order thus to be able to dispose the blow mold on the transforming station).

The following further relates to a method for operating a system for transforming plastic parisons into plastic containers, wherein in a working operation the plastic parisons are expanded by application of a free-flowing medium within a blow molding device, wherein the blow mold has a base part which is releasably disposed on a support, and with a first fastening mechanism the base part is fastened to the support, and wherein the blow mold has at least one side part which is releasably disposed on a support and the side part is fastened by a second fastening mechanism to the support.

According to embodiments of the invention the first fastening mechanism is actuated by a free-flowing medium in order to unlatch the base part from the support and the second fastening mechanism is actuated by a free-flowing medium in order to unlatch the side part from the support, wherein, furthermore, a media connection device is provided in order to deliver the free-flowing medium to the fastening mechanisms.

Therefore in terms of the method it is also proposed that the free-flowing medium is delivered by a common media connection to the two fastening mechanisms. Thus, as mentioned above, it is possible to carry out the change in a substantially accelerated manner.

The following further relates to a method for operating a system for transforming plastic parisons into plastic containers, in particular a method for changing blow molds, wherein in a working operation the plastic parisons are expanded by application of a free-flowing medium within a blow molding device, wherein this blow molding device is disposed on a transforming station and this transforming station is disposed on a rotatable support, wherein the blow mold has a base part which is releasably disposed on a support, and with a first fastening mechanism the base part is fastened to the support, and wherein the blow mold has at least one side part which is releasably disposed on a support and the side part is fastened by a second fastening mechanism to this support.

According to embodiments of the invention, in order to release at least the base part or the side part an actuating device is connected to the system or to the transforming station in such a way that at least one fastening mechanism can be actuated and in particular can be controlled by a free-flowing medium.

Therefore in terms of the method it is also proposed that a connection is produced between the actuating mechanism and the transforming station, and subsequently, in particular, release of the blow mold is achieved by application of the gaseous medium.

The support is preferably oriented with regard to the rotated position relative to the actuating device.

In a preferred method it is possible that first of all in particular the blow molding wheel can rotate by its main drive to a starting position, for example a position at which the blow mold of a first transforming station can be changed.

Furthermore, an actuator preferably moves out and produces a positively engaged connection. Simultaneously the blow molding wheel is precisely positioned by production of this connection. In a further method step a robot gripper moves in and in particular produces a positively engaged connection to the blow mold (so that the blow mold is preferably retained (at least also) by the robot). By the above-mentioned positively engaged connection between the actuating device and the transforming station, compressed air can be connected for unlatching of the blow molds or the side parts and the base parts. In a subsequent step the mold supports are opened, which in particular takes place by swivelling apart thereof. Furthermore, the base mold can be moved downwards. In this state the blow mold is preferably retained only by the robot device. The mold change operation can now be started, i.e. a blow mold is removed and another blow mold is introduced. In a further method step the mold support is closed and/or the base mold is also moved upwards. The compressed air supply is switched off, with the result that—as mentioned above—the individual fastening mechanisms are latched in each case. Furthermore, the base mold is also moved upwards. Lastly the actuator moves back again, so that now the blow molding wheel is preferably no longer prevented from rotating by the actuator. The main drive now rotates the blow molding wheel to the next position for replacement of the next blow mold.

In a further advantageous method, an opening of the blow mold and/or an unlatching of the mold support during a shutdown of the transforming station is carried out. An opening of the blow mold and/or an unlatching of the mold support is advantageously carried out, after the blow molding wheel has been positioned and preferably also after a connection has been produced between the transforming station and the actuating device.

This opening of the blow mold and/or the unlatching of the mold support are preferably performed by an operating member and in particular a cam segment which is a component of the actuating device. For the opening of the blow mold and/or the unlatching of the mold support an operating member and in particular a cam segment are preferably moved.

Advantageously this fastening mechanism has a release element which is movable in a predetermined straight direction, and by a displacement of this release element into a first predetermined position the fastening of the base part and/or the side part on the (respective) support is released and by a displacement of this release element into a second predetermined position the base part and/or the side part can be fastened on the (respective) support.

Advantageously, a free-flowing temperature control medium flows through at least one base part and/or at least one side part of this blow molding device, wherein this temperature control medium is delivered to the base part and/or the side part by a connector.

By removal of the base part and/or of the side part from the support the connector can preferably also be separated and thus particularly preferably a connection between the base part or the side part and a temperature control medium supply can be broken. Furthermore a temperature control medium supply can be produced by a feeding movement of the base part or the side part towards the support.

In a further advantageous method the temperature control medium is delivered to the base part by a first connector and drawn off from the base part by a second connector, and when the base part is installed on or removed from the support connecting elements of the first connector and connecting elements of the second connector are connected to one another or released from one another with a time delay.

BRIEF DESCRIPTION

Some of the embodiments will be described in detail, with reference to the following figures, wherein like designations denote like members, wherein:

FIG. 10 shows a representation of the actuating device with cam segments; and

FIG. 11 the representation the actuating device according to FIG. 10 with a transforming station.

DETAILED DESCRIPTION

Figure 1:
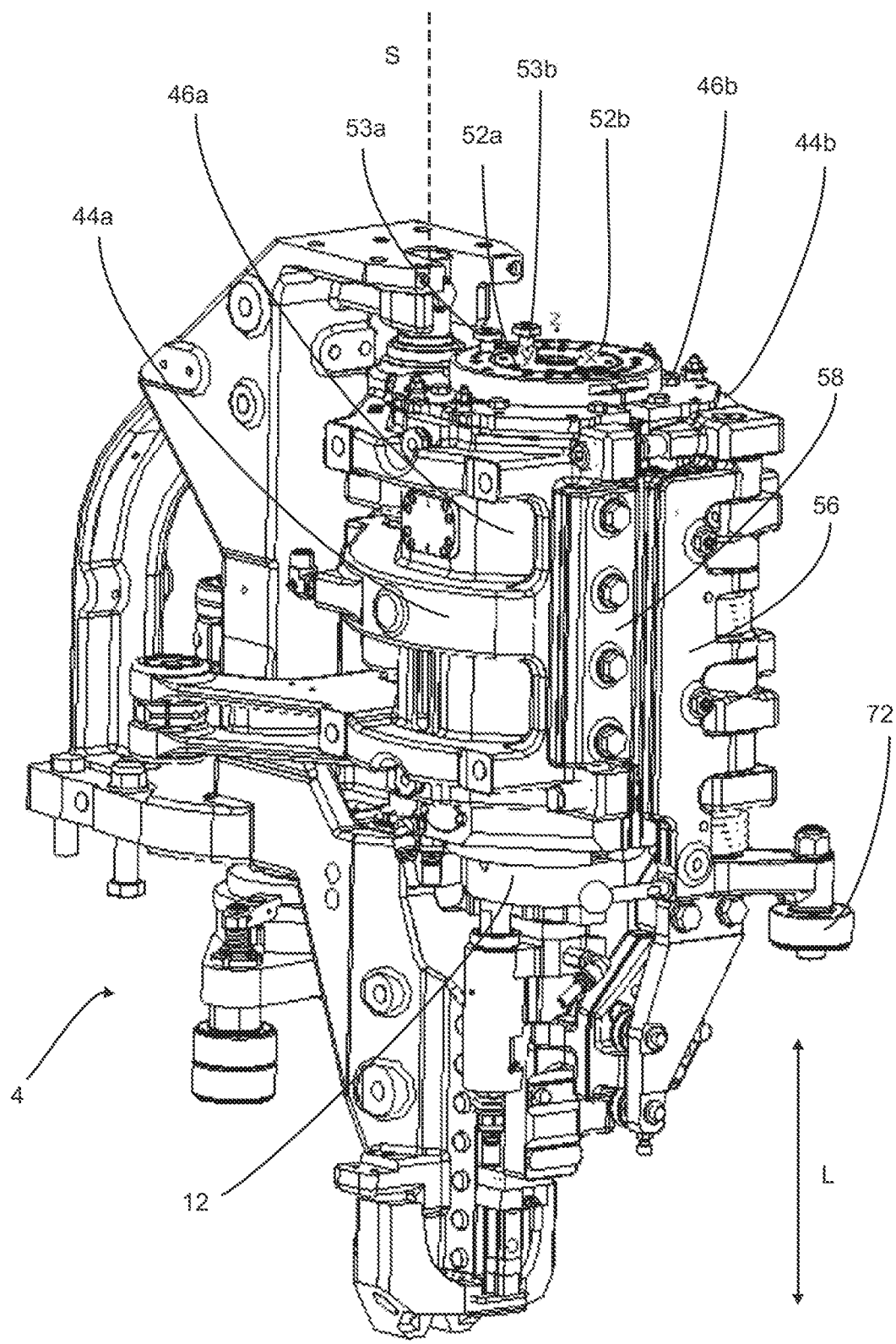
FIG. 1 shows a representation of a transforming device.

FIG. 1 shows a transforming station 4 of a transforming device according to embodiments of the invention (not shown in its entirety) in a closed state. In this case this transforming device 1 has a first blow mold support part 44a as well as a second blow mold support part 44b. These two parts can be pivoted apart with respect to a pivot axis S which extends vertically here in order thus to be able to insert a plastic parison into a blow mold. Blow mold support shells 46a and 46b are disposed on these two blow mold support parts 44a, 44b. In this case these blow mold support shells can be fastened by a (quick-) fastening mechanism. This quick-fastening mechanism can likewise be actuated automatically.

In each case blow mold support parts 46a, 46b are in turn disposed on the blow mold support shells 52a and 52b. The reference signs 53a and 53b designate projections or gripping elements on which the blow molds can be gripped and raised by an automatic changing device, such as a robot.

The reference signs 56 and 58 relate to two latching elements which serve for latching the blow mold. In this case a latching element 58 is disposed on the blow mold support part 44a, and the other latching element which can swivel with respect to a vertical axis is disposed on the blow mold support part 44b. Open and closing of this latching mechanism can be achieved by a curved roller 72.

The reference sign 12 designates a support on which the blow mold is disposed. This support can be raised and lowered—in particular when the system is in operation—by a drive, such as for example a motor drive or also a hydraulic or pneumatic drive (in particular for closing and opening the blow mold).

Figure 2:
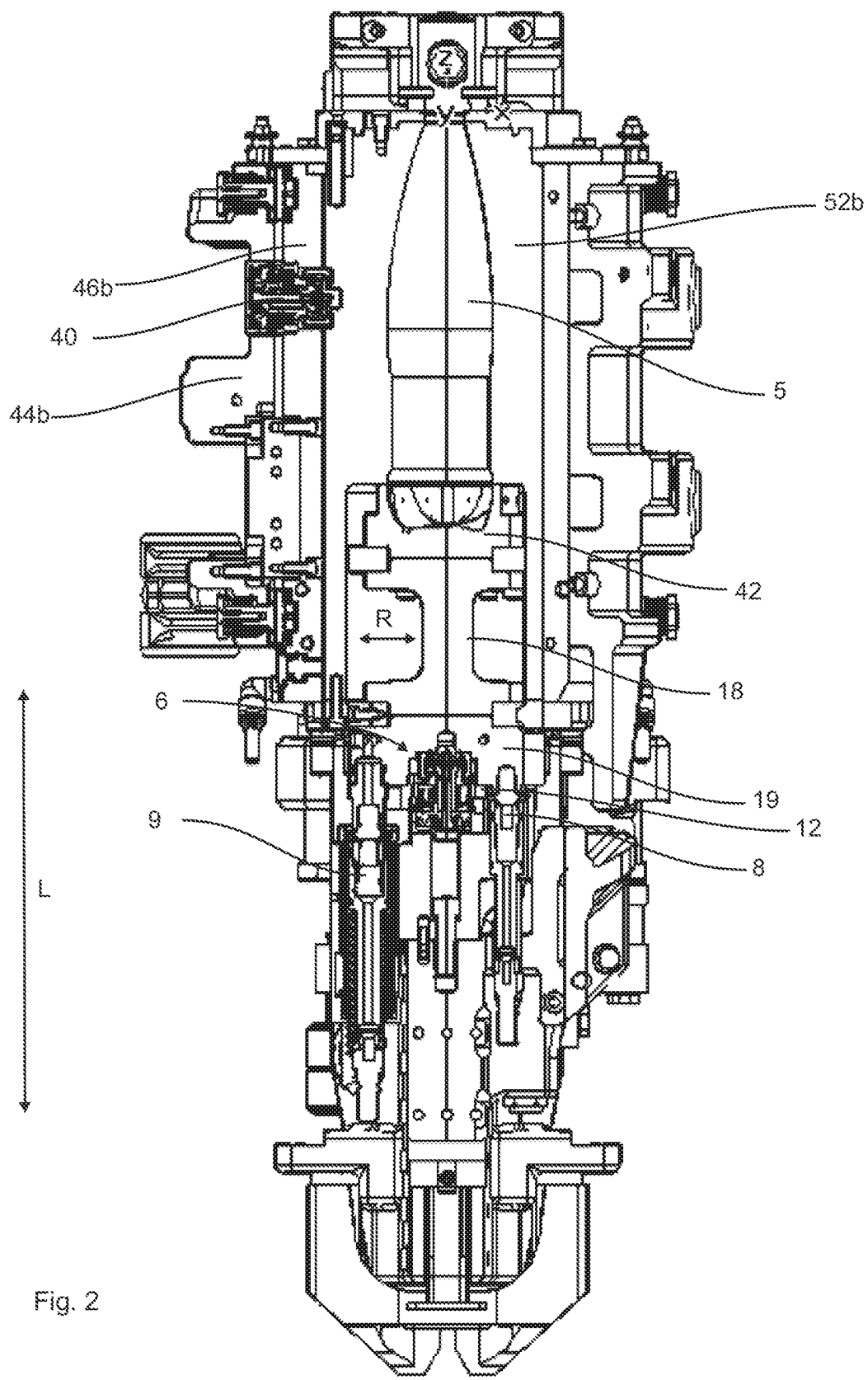
FIG. 2 shows a sectional representation of a transforming device.

FIG. 2 shows a sectional representation of the transforming station 1. This again shows the blow mold part 52b which is disposed on a blow mold support shell 46b as well as a blow mold support 44b. The reference sign 40 designates the fastening mechanism by which the blow mold support shell part is disposed on the blow mold support part 46b. In the hollow space 5 a plastic parison can be expanded by application of compressed air to form the plastic container. For this purpose, as mentioned above, compressed air is applied to the mouth of the plastic parison.

The reference sign 42 designates a base part of the blow mold, which likewise delimits the hollow space 5. This base part 42 is disposed on an intermediate support 18 which also serves for adaptation to different container types. The intermediate support 18 in turn is fastened to a fastening part 19 and this in turn is fastened on the support part 12 by the fastening mechanism according to embodiments of the invention.

The reference signs 8 and 9 schematically designate connectors which serve for delivery of a cooling medium. Inside the fastening part 19 the corresponding fluid channels (not shown) extend initially radially inwards, then likewise in a vertical direction through the intermediate support 18 and in this way enter the base part 42 in order to control the temperature thereof. Therefore the base part 42 preferably also has temperature control medium channels (not shown).

Figure 3:
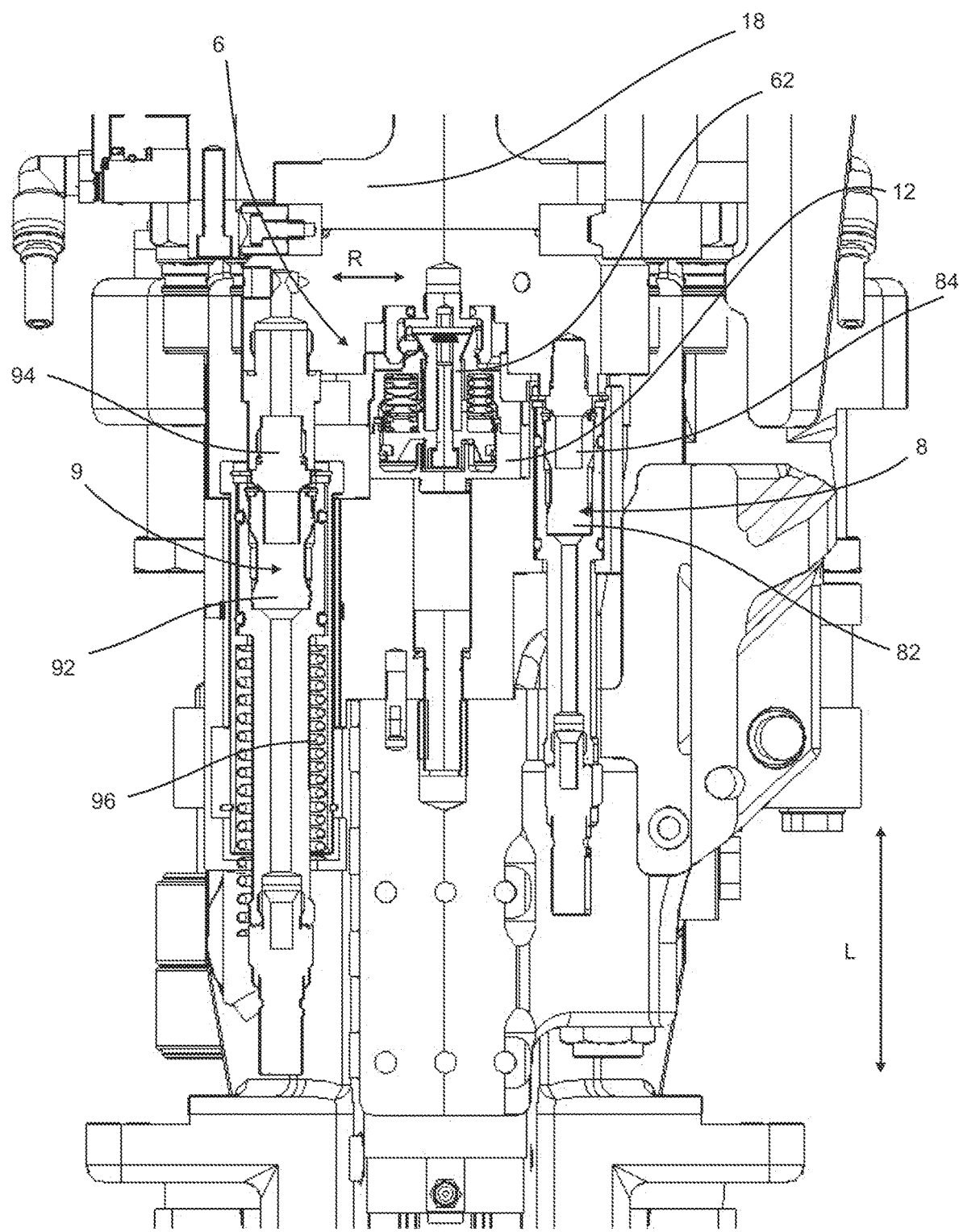
FIG. 3 shows a representation of a detail of the transforming device shown in FIG. 2.

FIG. 3 shows a representation of a detail of the system shown in FIG. 2. In this case the reference sign 6 relates overall to the fastening mechanism. This fastening mechanism has a release element 62 which is movable in the vertical direction or in the longitudinal direction L. Also the removal of the blow mold takes place in this direction. Due to this movement in the same direction the connectors 8 or the connecting elements 82 and 84 or 92 and 94 thereof are separated from one another. The release element or actuating element can be raised by the application of compressed air, as is explained in greater detail below, in order to release the locking between the support 12 and the fastening part 19 and thus also the locking with the base part of the blow molding device. In this case the fastening part 19 can be constructed as a disc-like body which for example is screwed on the intermediate support. This fastening part is removed together with the base part 42 and the intermediate support 18 when the base part 42 is changed. The reference sign R designates a direction perpendicular to the longitudinal direction L. In this direction for example the side parts are removed from their respective substrate.

In FIG. 3 the reference sign 96 relates to a spring element which biases the connecting element 92 upwards. In this way a chronologically staggered release of the two connectors 8, 9 can be achieved.

Figure 4:
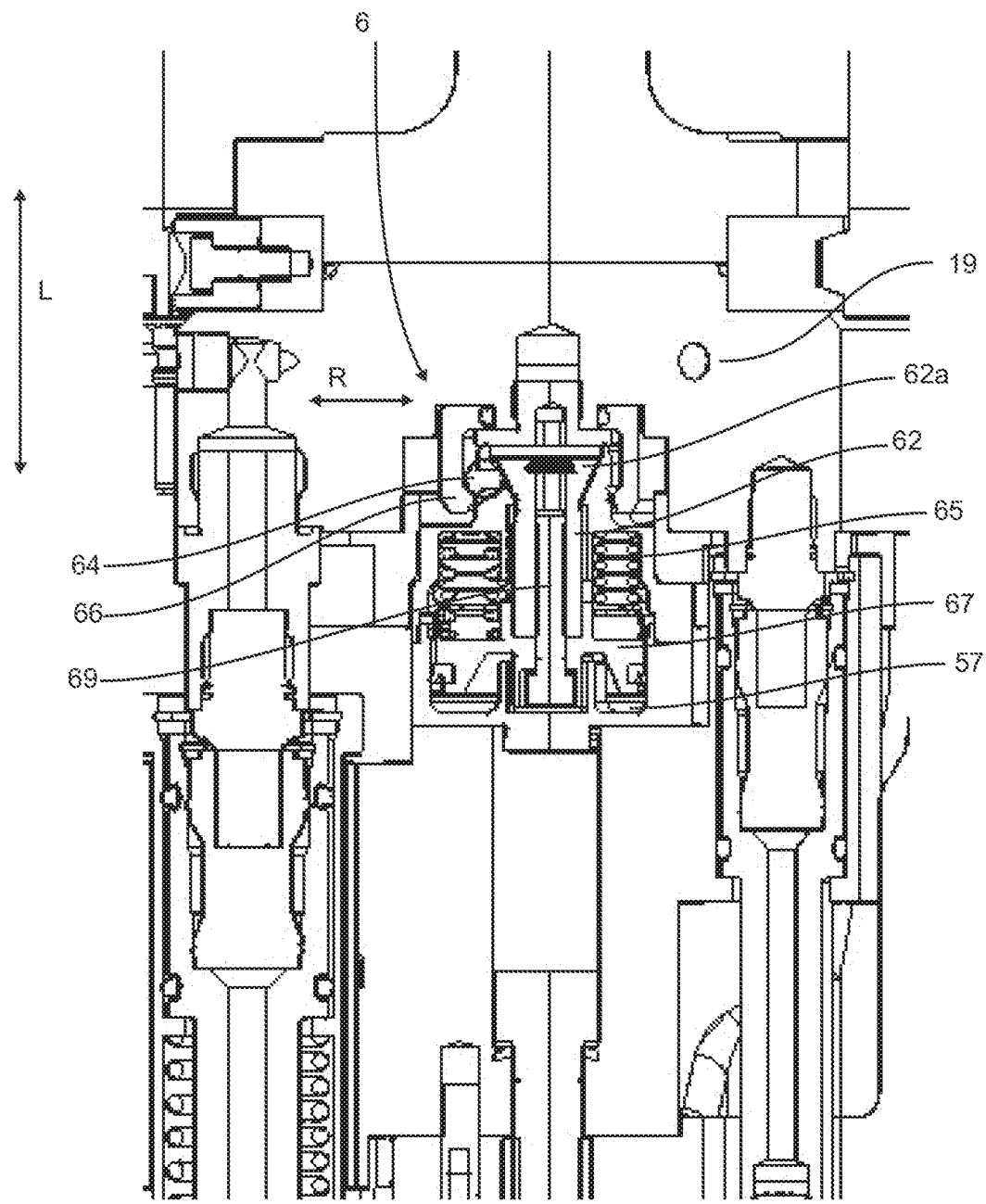
FIG. 4 shows a further representation of a detail of the transforming device shown in FIG. 2.
Figure 5:
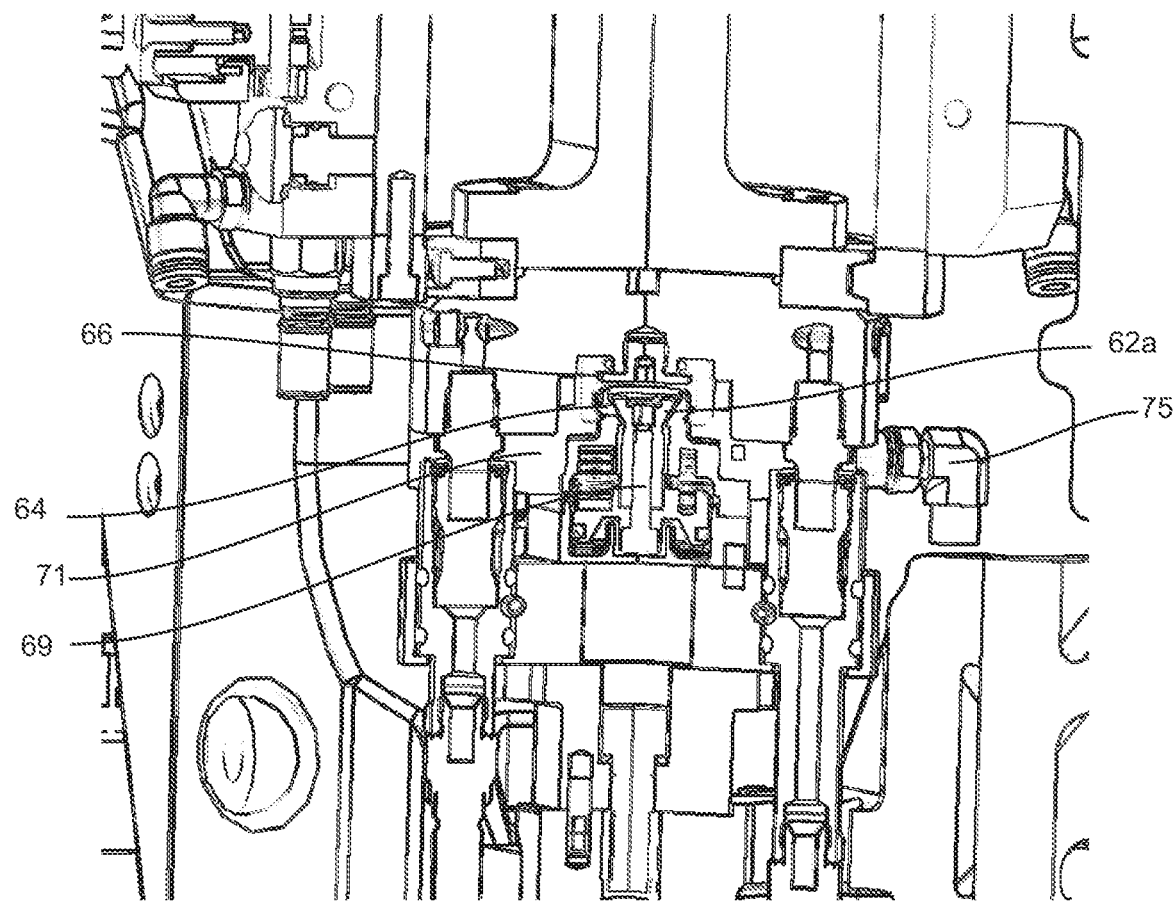
FIG. 5 shows a further representation of a detail of the transforming device shown in FIG. 2.

The fastening mechanism shown in greater detail in FIGS. 3 to 5 can also be used for fastening the side parts on the supports thereof, i.e. in particular the blow mold support shells. In this case, however, the fastening mechanisms 6 shown in each case are disposed in a position which is rotated substantially by 90° with respect to the position shown.

In FIG. 4 the mode of functioning of the fastening mechanism 6 is illustrated in greater detail. In the normal operational state the release element 62 is pressed downwards by a spring element 65. In this way the locking element 64 is pressed outwards by the inclined surface 62a and in this way engages in the fastening element 66. A separation between the element 72 and the support 12 can be prevented by this engagement. If compressed air is now applied to the receiving chamber 67, the actuating element 62 will move upwards and in this way the locking element 64 will retract again and therefore will no longer be in engagement with the fastening element 66. In this position the fastening part 19 and thus also the base part here can be lifted off upwards in the direction L. Simultaneously the connectors are also separated in this way, albeit with a time delay. The reference sign 69 relates to a guiding device which serves for guiding the release element 62. This guiding device 69 can engage in a hole in the release element 62, so that the release element 62 can slide relative to the guiding device 69, but in this case is guided by this guiding device 69. Thus the locking element is movable in the direction R shown in FIG. 4.

FIG. 5 shows a further representation of a detail of the fastening mechanism. This again shows the inclined surface 62a, which presses the locking element 64 radially outwards depending upon the position of the actuating element or release element. The reference sign 75 designates a connection for delivery of compressed air. This connection is in flow connection with the receiving chamber 57 shown in FIG. 4, so that release of the fastening mechanism 6 can be achieved by the application of compressed air. However, in a normal state the base part is locked on the support 12 by the spring element 65.

Figure 6:
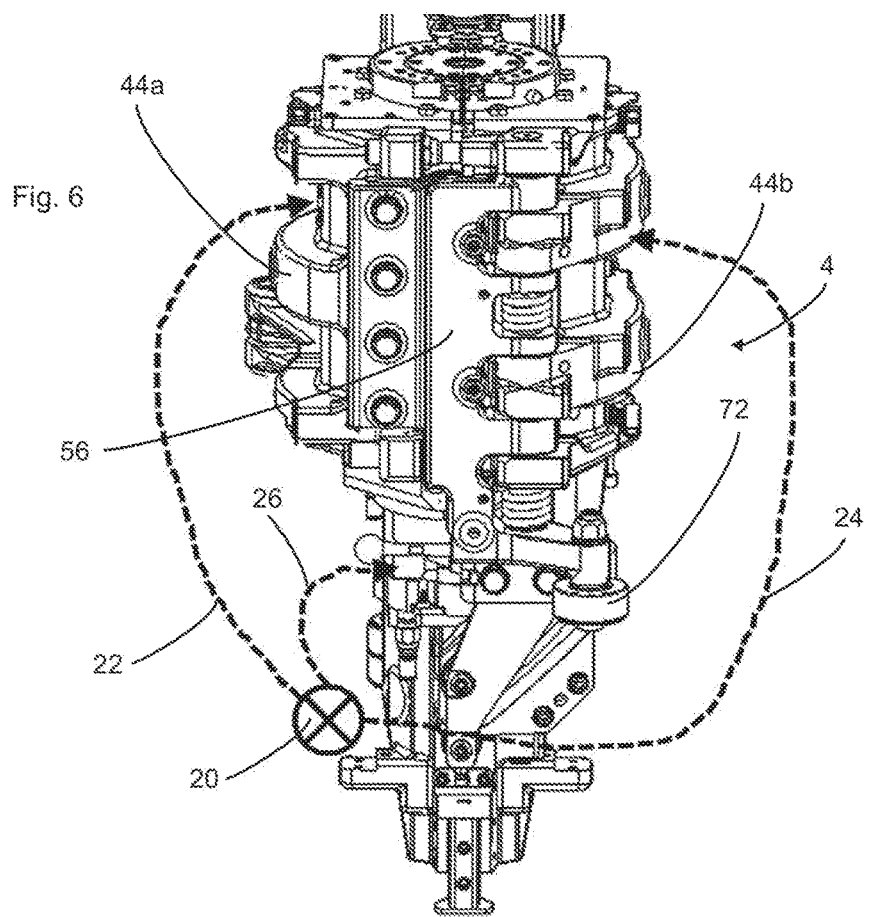
FIG. 6 shows a representation of the transforming device with a common media connection device.

FIG. 6 shows a further representation of a system according to embodiments of the invention. In this representation, in addition to the actual transforming station 4 with the side parts thereof or the mold supports 44a and 44b as well as the latching device 56, a central media connection device 20 is also illustrated schematically. By this central media connection device the free-flowing medium, in particular compressed air, can be delivered to the individual fastening mechanisms (only illustrated schematically). For this purpose three flexible hoses (or flexible supply lines) 22, 24 and 26, which serve to convey the free-flowing medium, are provided here. Due to the flexibility of these hoses, opening and closing of the blow mold is also possible while the hoses are still connected, and at the same time the media connection 20 can be disposed in a stationary manner. This means that the mold support halves and also the base support move relative to this media connection 20.

Figure 7:
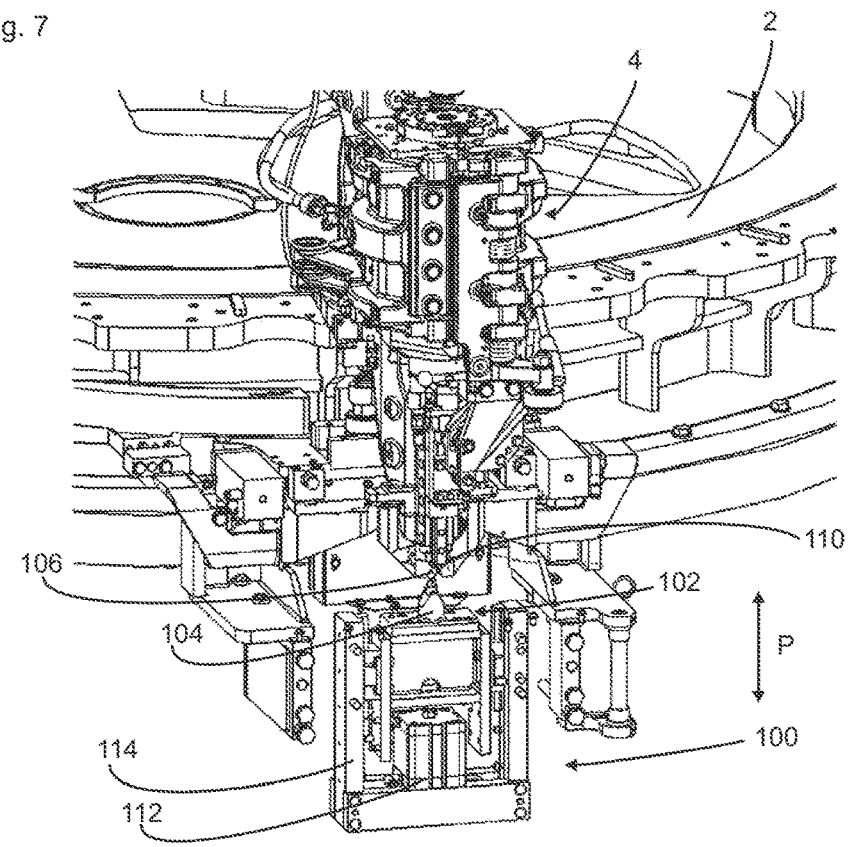
FIG. 7 shows a representation of a transforming device with an actuating device.

FIG. 7 shows a further embodiment of a system according to embodiments of the invention. This illustration also shows the rotatable support 2 on which a plurality of transforming stations 4 (only one of which is shown here) are disposed. Furthermore, this illustration also shows the actuating device 100 which serves to release the individual fastening mechanisms in the event of a mold change. This actuating device 100 is disposed in a stationary manner, i.e. the support 2 with the transforming stations 4 rotates relative to this actuating device. In this case the actuating device has a (in particular stationary) frame or support 114, on which a drive 112 is disposed. The reference numeral 1 relates to the system as a whole.

This drive serves in order to move the actuator element 102 in the direction of the double arrow P, i.e. to raise it or to lower it. The actuator element 102 has a first engaging means 104, preferably in the form of a positive-locking element, which is disposed in a second engaging means 106, which can engage on the transforming station. Due to this engagement and in particular the co-operation of oblique surfaces, which are disposed on the two engaging means 104 and 106, the transforming station 4 can be positioned relative to the actuating device 100. The reference numeral 110 designates a coupling element, by which a flow connection can be produced. As soon as this flow connection is produced, the individual fastening mechanisms are supplied with the free-flowing medium and in particular with the compressed air, as shown in FIG. 7.

Figure 8:
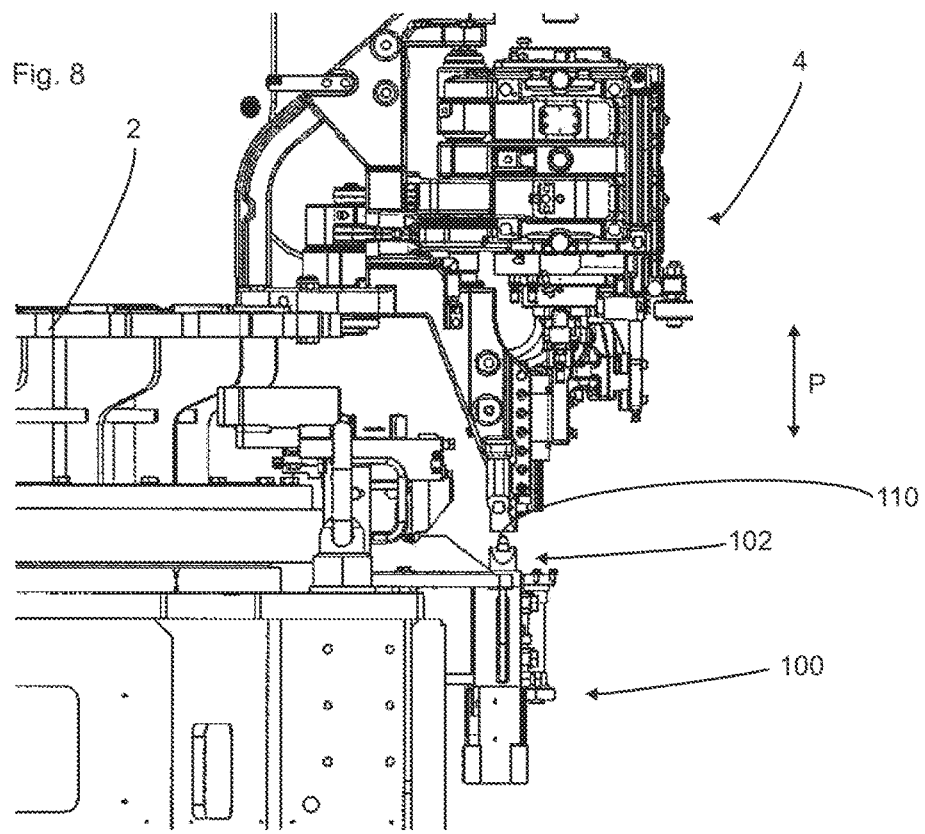
FIG. 8 shows a side view of the system shown in FIG. 7.

FIG. 8 shows a side view of the system shown in FIG. 7. The actuating device 100 is again provided here, as well as the actuator element 102 which can be pushed upwards and downwards according to the double arrow P.

Figure 9:
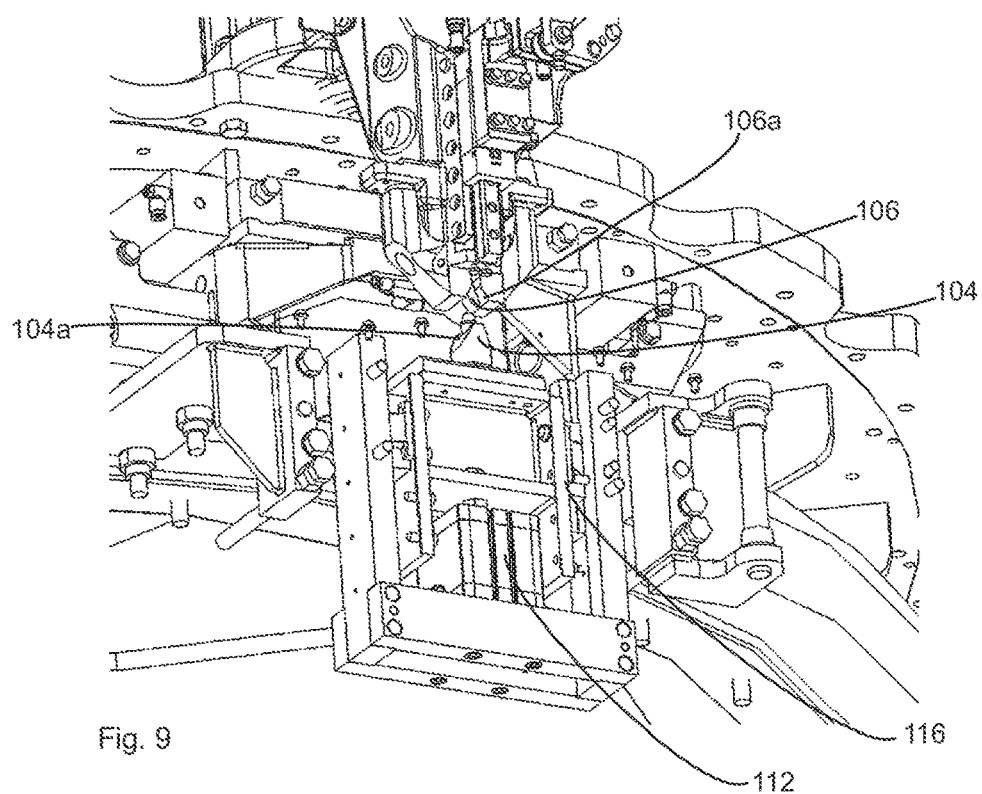
FIG. 9 shows a view of a detail of the system shown in FIG. 7.

Finally, FIG. 9 shows a detail of the system. This shows in particular lead-in inclined surfaces 104a, which can co-operate with corresponding inclined surfaces 106a in order thus to achieve the precise positioning of the transforming station 4 relative to the actuating device 100.

The reference numeral 116 designates a carriage which is movable relative to the support 114 and which enables the feed movement of the actuator element 102 towards the transforming station.

FIG. 10 shows a further representation of the actuating device 100. A first operating member 120, which has a cam segment 122, can be seen in this drawing. This cam segment is fastened on a support 124. This support 124 (with the cam segment 122) is movable in a straight line along the double arrow P1. The reference numeral 126 relates to a mounting device and driving device for movable mounting of the cam segment 122. With the aid of this cam segment, after the actuating device is connected to the transforming station, the mold support can be opened.

The reference numeral 140 relates to a second operating member, which likewise has a cam segment 142 arranged on a support 144. This cam segment 142 is movable along a double arrow P2 movable and serves for unlatching of the latching mechanism of the transforming station. The reference numeral 148 designates a driving device in order to move the cam segment 142.

FIG. 11 shows a representation of the actuating device 100 to which a transforming station is coupled. Within the context of this coupling, a cam roller 152 of the transforming station, which serves for opening and closing the mold support moves into the cam segment 122 and can be moved thereby (by actuation of the driving device 126). In this way the mold support can be opened.

Likewise the cam roller 72 moves into the cam segment 142 of the second operating member 140 and thus the latching between the mold supports can be unlatched by a corresponding movement of this cam segment 142.

The applicant reserves the right to claim all the features disclosed in the application documents as essential to embodiments of the invention in so far as they are individually or in combination novel over the known art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

| List of references | |
|---|---|
| L | longitudinal direction |
| R | direction different from L |
| 1 | system |
| 2 | rotatable support, blow molding wheel |
| 4 | transforming station |
| 5 | hollow space |
| 6 | first fastening mechanism |
| 8 | connector |
| 9 | connector |
| 12 | support part |
| 18 | intermediate support |
| 19 | fastening part |
| 20 | media connection device |
| 22, 24, 26 | flexible line |
| 40 | second fastening mechanism |
| 42 | base part |
| 44a | first blow mold support part |
| 44b | second blow mold support part |
| 46a, 46b | blow mold support shell |
| 52a, b | blow mold side part |
| 53a, b | projection or gripping element |
| 56 | latching element |
| 57 | receiving chamber |
| 58 | latching element |
| 62 | release element |
| 62a | inclined surface |
| 64 | locking element |
| 65 | spring element |
| 66 | fastening element |
| 69 | guiding device |
| 72 | cam roller |
| 75 | connection |
| 82, 84 | connecting element |
| 92, 94 | connecting element |
| 96 | spring element |
| 100 | actuating device |
| 102 | actuator element |
| 104 | engaging means |
| 104a | inclined surface |
| 106 | engaging means |
| 106a | inclined surface |
| 110 | coupling element |
| 114 | base support |
| 116 | carriage |
| 120 | first operating member |
| 122 | cam segment |
| 124 | support of the cam segment 122 |
| 126 | guiding and driving device |
| 140 | second operating member |
| 142 | cam segment |
| 144 | support of the cam segment 142 |
| 148 | driving device |
| 152 | cam roller |
| P | direction of movement |
| P1, P2 | directions of movement of the operating members |

The invention claimed is:

1. A system for transforming plastic parisons into plastic containers, comprising:
   at least one transforming station which has a blow mold within which the plastic parisons can be expanded by application of a gaseous medium,
   wherein the blow mold has a base part which is disposed releasably on a support, and a first fastening mechanism in order to fasten the base part to the support,
   wherein the blow mold has at least one side part which is disposed releasably on a support and a second fastening mechanism in order to fasten the side part to the support, wherein the first fastening mechanism can be actuated by a free-flowing medium in order to unlatch the base part from the support and the second fastening mechanism can be actuated by the free-flowing medium in order to unlatch the side part from the support, and a media connection device configured to deliver the free-flowing medium simultaneously to at least the first and second fastening mechanisms.

2. The system according to claim 1, wherein at least one fastening mechanism is configured in such a way that it is in a latched state in a pressureless state with respect to the free-flowing medium.

3. The system according to claim 1, wherein at least one fastening mechanism can be brought from a latched state into an unlatched state by the application of a predetermined pressure of the free-flowing medium, wherein this predetermined pressure is greater than 2 bars.

4. The system according to claim 1, wherein the media connection device is connected by at least one preferred flexible supply line to at least one fastening mechanism.

5. The system according to claim 1, wherein the blow mold has at least one further side part which is disposed releasably on a support and a second fastening mechanism in order to fasten the side part to the support.

6. The system according claim 1, wherein the fastening mechanism has a pretensioning device which fixes at least one blow mold part by non-positive and/or positive engagement on the support associated with this blow mold part.

7. The system according to claim 6, wherein the pretensioning device can be acted upon by the free-flowing medium.

8. The system according to claim 6, wherein the fastening mechanism has a movable piston which is displaceable by the free-flowing medium into a first position and/or is displaceable by the pretensioning device into a second position.

9. A method for operating a system for transforming plastic parisons into plastic containers,
   wherein in a working operation the plastic parisons are expanded by application of a free-flowing medium within a blow molding device,
   wherein the blow mold has a base part which is releasably disposed on a support, and
   wherein a first fastening mechanism fastens the base part to the support, and
   wherein the blow mold has at least one side part which is releasably disposed on a support and wherein a second fastening mechanism fastens the side part to the support,
   wherein the first fastening mechanism is actuated by a free-flowing medium in order to unlatch the base part from the support and the second fastening mechanism is actuated by a free-flowing medium in order to unlatch the side part from the support, and
   a media connection device is provided in order to deliver the free-flowing medium to the fastening mechanisms.

10. The method according to claim 9, wherein a free-flowing temperature control medium flows through at least one base part and/or a side part of this blow molding device, wherein this temperature control medium is delivered to the base part and/or the side part by a connector.

11. A system for transforming plastic parisons into plastic containers comprising:
    at least one transforming station which is arranged on a movable support and which has a blow mold within which the plastic parisons can be expanded by application of a gaseous medium,
    wherein the blow mold has a base part which is disposed releasably on a support, and with a fastening mechanism in order to fasten the base part to the support, and/or wherein the blow mold has at least one side part which is disposed releasably on a support, and with a second fastening mechanism in order to fasten the side part to the support,
    wherein the system has an actuating device, and the transforming station is designed to be movable in at least one direction of movement of the support relative to this actuating device,
    wherein at least one element of the actuating device is suitable and intended for producing a connection by positive and/or non-positive engagement to at least one element of the transforming station and wherein the system has a positioning device in order to position the transforming station relative to the actuating device.

12. The system according to claim 11, wherein a media connection device is provided to deliver a free-flowing medium to the fastening mechanisms.

13. The system according to claim 11, wherein the actuating device serves for actuating at least one fastening mechanism.

14. The system according to claim 11, wherein the actuating device produces a fluid connection to the media connection device—so that at least one fastening mechanism can be acted upon by a free-flowing medium in order to switch this fastening mechanism between at least two positions.

15. The system according to claim 11, wherein the actuating device has an actuator element, wherein this actuator element has a first positively engaging element, which is suitable and intended for co-operation with a second positively engaging element which is disposed on the transforming station in order thus to produce a positively engaged connection.

16. The system according to claim 11, wherein the first fastening mechanism can be actuated by a free-flowing medium in order to unlatch the base part from the support and the second fastening mechanism can be actuated by a free-flowing medium in order to unlatch the side part from the support, furthermore, a media connection device is provided in order to deliver the free-flowing medium to the fastening mechanisms.

17. The system according to claim 11, wherein the system has a gripping device in order to remove the blow mold or parts of the blow mold from the transforming station.

18. The system according to claim 11, wherein the system has a coupling element in order to produce a flow connection for the free-flowing medium.

19. The system according to claim 11, wherein the system and in particular the actuating device has at least one operating member for opening the mold support and/or for unlatching the mold support.

20. A method for operating a system for transforming plastic parisons into plastic containers, wherein in a working operation the plastic parisons are expanded by application of a free-flowing medium within a blow molding device, wherein this blow molding device is disposed on a transforming station and this transforming station is disposed on a rotatable support, wherein the blow mold has a base part which is disposed releasably on a support, and the base part is fastened to the support with a fastening mechanism, wherein the blow mold has at least one side part which is disposed releasably on a support, and with a second fastening mechanism in order to fasten the side part to the support, wherein the support is aligned with regard to its rotated position relative to the actuating device and in order to release at least the base part and/or the side part an actuating device is connected to the system in such a way that at least one fastening mechanism can be actuated and in particular can be controlled by a free-flowing medium.

21. The method according to claim 20, wherein a positively engaged connection between the actuating device and the transforming station is produced.

22. The method according to claim 20, wherein mold supports of the transforming station are opened and/or latching between the mold supports is unlatched by an operating member disposed on the actuating device.

* * * * *